United States Patent
Ikeda et al.

(10) Patent No.: US 12,516,190 B2
(45) Date of Patent: Jan. 6, 2026

(54) CURABLE COMPOSITION, URETHANE RESIN, AND HEAT DISSIPATION MEMBER

(71) Applicant: SANYO CHEMICAL INDUSTRIES, LTD., Kyoto (JP)

(72) Inventors: Shunsuke Ikeda, Kyoto (JP); Tomoya Ohta, Kyoto (JP); Ryo Yoshimoto, Kyoto (JP); Koichi Mori, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 633 days.

(21) Appl. No.: 18/010,053

(22) PCT Filed: Jun. 23, 2021

(86) PCT No.: PCT/JP2021/023790
§ 371 (c)(1),
(2) Date: Dec. 13, 2022

(87) PCT Pub. No.: WO2021/261519
PCT Pub. Date: Dec. 30, 2021

(65) Prior Publication Data
US 2023/0227650 A1    Jul. 20, 2023

(30) Foreign Application Priority Data
Jun. 26, 2020    (JP) ................. 2020-110058

(51) Int. Cl.
*C08L 75/04* (2006.01)
*C08G 18/22* (2006.01)
(Continued)

(52) U.S. Cl.
CPC ............ *C08L 75/04* (2013.01); *C08G 18/227* (2013.01); *C08G 18/3885* (2013.01); *C08G 18/4018* (2013.01); *C08G 18/42* (2013.01); *C08G 18/44* (2013.01); *C08G 18/4804* (2013.01); *C08G 18/4808* (2013.01); *C08G 18/4812* (2013.01); *C08G 18/4825* (2013.01); *C08G 18/4829* (2013.01); *C08G 18/4833* (2013.01); *C08G 18/4854* (2013.01); *C08G 18/5084* (2013.01); *C08G 18/66* (2013.01); *C08G 18/6666* (2013.01); *C08G 18/755* (2013.01); *C08G 18/792* (2013.01); *C08K 3/22* (2013.01); *C08K 5/103* (2013.01); *C08K 5/523* (2013.01); *C08K 7/18* (2013.01); *C09K 5/14* (2013.01);
(Continued)

(58) Field of Classification Search
CPC ... C08L 75/04; C08G 18/227; C08G 18/4808; C08G 18/3885; C08G 18/42; C08G 18/44; C08G 18/4804; C08G 18/4812; C08G 18/4825; C08G 18/4829; C08G 18/4833; C08G 18/4854; C08G 18/5084; C08G 18/66; C08G 18/6666; C08G 18/755; C08G 18/792; C08K 5/103; C08K 5/523; C08K 7/18; C08K 2201/014; C08K 3/08; C08K 3/26; C08K 3/28; C08K 2003/222; C08K 2003/2227; C08K 18/4018; C08K 3/22; C09K 5/14
See application file for complete search history.

(56) References Cited

U.S. PATENT DOCUMENTS

2006/0183848 A1    8/2006 Maier et al.
2015/0038641 A1    2/2015 Göbelt et al.
(Continued)

FOREIGN PATENT DOCUMENTS

CN    103214853    7/2013
CN    104968731    10/2015
(Continued)

OTHER PUBLICATIONS

Office Action issued Sep. 25, 2023 in U.S. Appl. No. 17/269,596.
(Continued)

*Primary Examiner* — Rabon A Sergent
(74) *Attorney, Agent, or Firm* — Wenderoth, Lind & Ponack, L.L.P.

(57) ABSTRACT

The present invention aims to provide a urethane resin and a heat dissipation component each having excellent thermal conductivity and excellent flexibility. The present invention relates to a curable composition containing: a polyol (A); a polyisocyanate (B); at least one dispersant (C) for inorganic fillers selected from the group consisting of a phosphate ester (C1), a C12-C24 fatty acid (C2), a sucrose fatty acid ester (C3), a sorbitan fatty acid ester (C4), and a glycerol fatty acid ester (C5); and an inorganic filler (D), the curable composition satisfying the following requirements (1) to (3) that (1) the polyol (A) contains a polyalkylene glycol (A1) having a chemical formula weight or number average molecular weight of 1000 or less in an amount of 50% by weight or more based on the weight of the polyol (A); (2) the inorganic filler (D) is contained in an amount of 70 to 97% by weight based on the weight of the curable composition; and (3) the total weight of the dispersant (C) for inorganic fillers is 1 to 5 parts by weight per 100 parts by weight of the inorganic filler (D), the phosphate ester (C1) being represented by the following formula (1):

[Chem. 1]

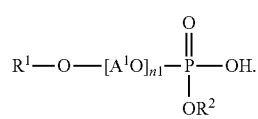

(1)

11 Claims, No Drawings

(51) Int. Cl.

| | | |
|---|---|---|
| *C08G 18/38* | (2006.01) | |
| *C08G 18/40* | (2006.01) | |
| *C08G 18/42* | (2006.01) | |
| *C08G 18/44* | (2006.01) | |
| *C08G 18/48* | (2006.01) | |
| *C08G 18/50* | (2006.01) | |
| *C08G 18/66* | (2006.01) | |
| *C08G 18/75* | (2006.01) | |
| *C08G 18/79* | (2006.01) | |
| *C08K 3/08* | (2006.01) | |
| *C08K 3/22* | (2006.01) | |
| *C08K 3/26* | (2006.01) | |
| *C08K 3/28* | (2006.01) | |
| *C08K 5/103* | (2006.01) | |
| *C08K 5/523* | (2006.01) | |
| *C08K 7/18* | (2006.01) | |
| *C09K 5/14* | (2006.01) | |

(52) U.S. Cl.
CPC .......... *C08K 3/08* (2013.01); *C08K 2003/222* (2013.01); *C08K 2003/2227* (2013.01); *C08K 3/26* (2013.01); *C08K 3/28* (2013.01); *C08K 2201/014* (2013.01)

(56) References Cited

U.S. PATENT DOCUMENTS

| | | |
|---|---|---|
| 2015/0197680 A1 | 7/2015 | Frank |
| 2015/0368435 A1 | 12/2015 | Ohno |
| 2016/0251553 A1 | 9/2016 | Garrett et al. |
| 2016/0284905 A1 | 9/2016 | Mitobe et al. |
| 2020/0369823 A1 | 11/2020 | Yoshimoto et al. |
| 2021/0198413 A1 | 7/2021 | Mori et al. |

FOREIGN PATENT DOCUMENTS

| | | |
|---|---|---|
| CN | 106947073 | 7/2017 |
| CN | 107041141 | 8/2017 |
| JP | 58-122959 | 7/1983 |
| JP | 5-78447 | 3/1993 |
| JP | 2005-343983 | 12/2005 |
| JP | 2008-115356 | 5/2008 |
| JP | 2009-13237 | 1/2009 |
| JP | 2010-150474 | 7/2010 |
| JP | 2010-215820 | 9/2010 |
| JP | 2010-248350 | 11/2010 |
| JP | 2010-280760 | 12/2010 |
| JP | 2012-21124 | 2/2012 |
| JP | 2012-180453 | 9/2012 |
| JP | 2013-18988 | 1/2013 |
| JP | 2014-39066 | 2/2014 |
| JP | 2014-227449 | 12/2014 |
| JP | 2015-530470 | 10/2015 |
| JP | 2018-35263 | 3/2018 |
| JP | 2018-70850 | 5/2018 |
| JP | 2018-127567 | 8/2018 |
| WO | 2005/010067 | 2/2005 |
| WO | 2012/175157 | 12/2012 |
| WO | 2014/122866 | 8/2014 |
| WO | 2014/126141 | 8/2014 |
| WO | 2018-051740 | 3/2018 |
| WO | 2019/189894 | 10/2019 |
| WO | 2020/040177 | 2/2020 |
| WO | 2022/000166 | 1/2022 |

OTHER PUBLICATIONS

Google translation of JP2012-021124A (Year: 2023).
Office Action issued Apr. 29, 2022 in Chinese Patent Application No. 201980054327.8, with English language translation.
Yuliang et al., Annual Meeting of Elastomer Professional Committee of China Polyurethane Industry Association & Symposium on Polyurethane and Elastomer Technology, 2016.
International Search Report issued Nov. 5, 2019 in International (PCT) Application No. PCT/JP2019/032580.
International Search Report issued Sep. 14, 2021 in International (PCT) Application No. PCT/JP2021/023790.
Lin et al., "Synergistic Effect of Metal Oxides on the Flame Retardancy and Thermal Degradation of Novel Intumescent Flame-Retardant Thermoplastic Polyurethanes", Journal of Applied Polymer Science, (2011), vol. 121, pp. 1951-1960.

CURABLE COMPOSITION, URETHANE RESIN, AND HEAT DISSIPATION MEMBER

TECHNICAL FIELD

The present invention relates to curable compositions, urethane resins produced by curing the curable compositions, and heat dissipation components containing the urethane resins.

BACKGROUND ART

Thermally conductive resins are known as resins that externally discharge (dissipate) heat generated from electronic components or the like. Known heat dissipation methods using thermally conductive resins include laminating thermally conductive resins on the housing of a heating element. To achieve efficient heat dissipation using such a method, a thermally conductive resin needs to have not only excellent thermal conductivity but also flexibility that allow the resin to follow the shape of the heating element and to adhere to the surface of the heating element.

Known thermally conductive resins having thermal conductivity and flexibility include the polyurethane polymer described in Patent Literature 1. The polyurethane polymer described in Patent Literature 1 however does not have sufficient thermal conductivity. Increasing the amount of a heat dissipation (thermally conductive) filler in order to enhance the heat dissipation results in reduced flexibility and reduced heat dissipation efficiency of the polyurethane polymer.

A recent increase in use of heat generating components that generate a large amount of heat and have complex shapes requires development of thermally conductive resins that can have both better thermal conductivity and better flexibility.

CITATION LIST

Patent Literature

Patent Literature 1: JP 2015-530470 T

SUMMARY OF INVENTION

Technical Problem

The present invention aims to provide a thermally conductive urethane resin having excellent thermal conductivity and excellent flexibility.

Solution to Problem

As a result of extensive studies to solve the above problem, the present inventors arrived at the present invention.

That is, the present invention relates to a curable composition containing:
 a polyol (A);
 a polyisocyanate (B);
 at least one dispersant (C) for inorganic fillers selected from the group consisting of a phosphate ester (C1), a C12-C24 fatty acid (C2), a sucrose fatty acid ester (C3), a sorbitan fatty acid ester (C4), and a glycerol fatty acid ester (C5); and
 an inorganic filler (D),
 the curable composition satisfying the following requirements (1) to (3) that
 (1) the polyol (A) contains a polyalkylene glycol (A1) having a chemical formula weight or number average molecular weight of 1000 or less in an amount of 50% by weight or more based on the weight of the polyol (A);
 (2) the inorganic filler (D) is contained in an amount of 70 to 97% by weight based on the weight of the curable composition; and
 (3) the total weight of the dispersant (C) for inorganic fillers is 1 to 5 parts by weight per 100 parts by weight of the inorganic filler (D),
 the phosphate ester (C1) being represented by the following formula (1):

[Chem. 1]

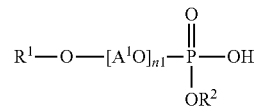

(1)

wherein $R^1$ is a hydrogen atom, a C2-C18 alkyl group, or a C2-C18 alkenyl group; $A^1O$ is a C2-C3 alkyleneoxy group; n1 is an integer of 3 to 15; and $R^2$ is a hydrogen atom or $-(A^2O)_{n2}R^3$, where $R^3$ is a C2-C18 alkyl group or a C2-C18 alkenyl group; $A^2O$ is a C2-C3 alkyleneoxy group; and n2 is an integer of 3 to 15. The present invention also relates to a urethane resin which is a cured product of the curable composition. The present invention also relates to a heat dissipation component containing the urethane resin.

Advantageous Effects of Invention

The present invention can provide a urethane resin and a heat dissipation component each having excellent thermal conductivity and excellent flexibility.

DESCRIPTION OF EMBODIMENTS (1. Curable Composition)

A curable composition of the present invention contains a polyol (A); a polyisocyanate (B); at least one dispersant (C) for inorganic fillers selected from the group consisting of a phosphate ester (C1), a C12-C24 fatty acid (C2), a sucrose fatty acid ester (C3), a sorbitan fatty acid ester (C4), and a glycerol fatty acid ester (C5); and an inorganic filler (D),
 the phosphate ester (C1) being represented by the following formula (1):

[Chem. 2]

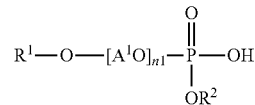

(1)

wherein $R^1$ is a hydrogen atom, a C2-C18 alkyl group, or a C2-C18 alkenyl group; $A^1O$ is a C2-C3 alkyleneoxy group; n1 is an integer of 3 to 15; and $R^2$ is a hydrogen atom or -(A²O)$_{n2}$R³, where R³ is a C2-C18 alkyl group or a C2-C18 alkenyl group; A²O is a C2-C3 alkyleneoxy group; and n2 is an integer of 3 to 15.

The curable composition of the present invention may have an embodiment (first embodiment) in which the polyol (A), the polyisocyanate (B), the dispersant (C) for inorganic fillers, and the inorganic filler (D) are all contained in one formulation or may have an embodiment (second embodiment) in which the polyol (A), the polyisocyanate (B), the dispersant (C) for inorganic fillers, and the inorganic filler (D) are divided in two formulations. First, the first embodiment is described.

First Embodiment

A curable composition according to the first embodiment contains a polyol (A), a polyisocyanate (B), a dispersant (C) for inorganic fillers, and an inorganic filler (D) in one formulation.

The polyol (A) contains a polyalkylene glycol (A1) having a chemical formula weight or number average molecular weight of 1000 or less in an amount of 50% by weight or more based on the weight of the polyol (A).

Examples of the polyalkylene glycol (A1) include diols obtained by addition polymerization of C2-C4 alkylene oxides (hereinafter referred to as AOs) to C2-C20 aliphatic diols.

Examples of the C2-C20 aliphatic diols include ethylene glycol, propylene glycol, 1,3- or 1,4-butanediol, 1,6-hexanediol, and neopentyl glycol. Preferred are ethylene glycol and propylene glycol, with ethylene glycol being more preferred.

Examples of the AOs include ethylene oxide, 1,2- or 1,3-propylene oxide, and 1,2-, 1,3-, 1,4-, or 2,3-butylene oxide. Preferred are ethylene oxide, 1,2-propylene oxide and 1,3-propylene oxide, with 1,2-propylene oxide and 1,3-propylene oxide being more preferred.

Two or more of these AOs may be used in combination. When two or more of these AOs are used in combination, they may be bonded to each other by any of block addition, random addition, and a combination thereof.

The chemical formula weight or number average molecular weight of the polyalkylene glycol (A1) is 1000 or less, preferably 500 or less, still more preferably 300 or less. When the chemical formula weight or number average molecular weight of the polyalkylene glycol (A1) is 1000 or less, the amount of inorganic filler in the curable composition may be increased, and a cured product of the curable composition can be easily produced. When the chemical formula weight or number average molecular weight of the polyalkylene glycol (A1) is more than 1000, it tends to be hard to increase the amount of inorganic filler in the curable composition and to obtain a cured product of the curable composition.

The percentage of the polyalkylene glycol (A1) in the polyol (A) is 50% by weight or more, preferably 70 to 100% by weight, still more preferably 90 to 100% by weight, based on the weight of the polyol (A). When the percentage of the polyalkylene glycol (A1) in the polyol (A) is 50% by weight or more, the amount of inorganic filler in the curable composition may be increased, and a cured product of the curable composition can be easily produced. When the percentage of the polyalkylene glycol (A1) in the polyol (A) is less than 50% by weight based on the weight of the polyol (A), it is hard to increase the amount of inorganic filler in the curable composition and to obtain a cured product of the curable composition.

Herein, the number average molecular weight (Mn) is a value determined by gel permeation chromatography (hereinafter abbreviated to GPC) under the following conditions.
  Device: HLC-8120 (Tosoh Corporation)
  Column: TSKgel α-6000, G3000 PWXL (Tosoh Corporation)
  Detector: refractive index (RI)
  Eluent: 0.5% sodium acetate in water/methanol (volume ratio: 70/30)
  Eluent flow rate: 1.0 ml/min
  Column temperature: 40° C.
  Sample concentration: 0.25% by weight
  Amount to be injected: 200 μl
  Standard substance: TSK standard polyethylene oxide (Tosoh Corporation)
  Data processing software: GPC-8020 model II (Tosoh Corporation)

The polyalkylene glycol (A1) having a chemical formula weight or average molecular weight of 1000 or less can be produced by known methods. An example thereof is an addition reaction of AO to any of the C2-C20 aliphatic diols by known methods. The chemical formula weight or average molecular weight can be adjusted to 1000 or less by controlling the amount of AO used.

The polyalkylene glycol (A1) may be a commercial product. Preferred examples thereof include SANNIX PP-200 (polypropylene glycol with Mn of 200, available from Sanyo Chemical Industries, Ltd.), SANNIX PP-400 (polypropylene glycol with Mn of 400, available from Sanyo Chemical Industries, Ltd.), SANNIX PP-600 (polypropylene glycol with Mn of 600, available from Sanyo Chemical Industries, Ltd.), and SANNIX PP-950 (polypropylene glycol with Mn of 950, available from Sanyo Chemical Industries, Ltd.).

One of these polyalkylene glycols (A1) may be used alone or two or more of these may be used in combination.

The polyol (A) may contain a different polyol (A2) in addition to the polyalkylene glycol (A1).

Examples of the different polyol (A2) include an aliphatic diol (A21); a tri- or higher hydric aliphatic polyol (A22); an AO adduct (A23) of the aliphatic diol (A21), the adduct having a chemical formula weight or average molecular weight of more than 1000; an AO adduct (A24) of the aliphatic polyol (A22); an alicyclic polyol (A25); an AO adduct (A26) of the alicyclic polyol (A25); an AO adduct (A27) of a di- or higher hydric phenol; a polyester polyol (A28); a polybutadiene polyol (A29); and a polycarbonate polyol (A30).

The aliphatic diol (A21) may be a C2-C20 aliphatic diol, and is preferably a C2-C10, more preferably C2-05, aliphatic diol.

The tri- or higher hydric aliphatic polyol (A22) may be a tri- or higher hydric alcohol among C3-C20 aliphatic polyols. Examples thereof include glycerol and pentaerythritol. Preferred is glycerol.

The AO adduct (A23) of the aliphatic diol (A21) may be an AO adduct of the aliphatic diol (A21) described above, and may be one having a chemical formula weight or number average molecular weight adjusted to more than 1000 by controlling the amount of AO added. Examples of usable AOs include the C2-C4 AOs exemplified in the description of the polyalkylene glycol (A1), and the same applies to preferred examples thereof.

Examples of the AO adduct (A23) of the aliphatic diol (A21) include polypropylene glycol, polyethylene glycol, and polytetramethylene glycol, each having a chemical formula weight or number average molecular weight of more than 1000. Preferred among these are polypropylene glycol and polytetramethylene glycol, with polypropylene glycol being more preferred.

An example of the AO adduct (A24) of the aliphatic polyol (A22) is an AO adduct of the aliphatic polyol (A22) described above. Examples of the AO include those exemplified in the description of the polyalkylene glycol (A1), and the same applies to preferred examples thereof.

Examples of the AO adduct (A24) of the aliphatic polyol (A22) include an AO adduct of glycerol and an AO adduct of pentaerythritol. Specific examples thereof include polyoxyethylene triol (polyethylene glyceryl ether), polyoxypropylene triol (polyoxypropylene glyceryl ether), and polyoxyethylene polyoxypropylene triol (polyoxyethylene polyoxypropylene glyceryl ether). Preferred among these are polypropylene triol, polyoxyethylene polyoxypropylene triol, and polyoxypropylene triol, with polyoxyethylene polyoxypropylene triol and polyoxypropylene triol being more preferred. Commercial products thereof, such as SAN-NIX GP-1000 (polyoxypropylene glyceryl ether with Mn of 1000, available from Sanyo Chemical Industries, Ltd.), are preferably available.

Examples of the alicyclic polyol (A25) include C4-C16 alicyclic polyols such as 1,4-cyclohexanediol, 1,4-cyclohexanedimethanol, and hydrogenated bisphenol A.

An example of the AO adduct (A26) of the alicyclic polyol (A25) is an AO adduct of the alicyclic polyol (A25) described above. Examples of the AO include those exemplified in the description of the polyalkylene glycol (A1), and the same applies to preferred examples thereof.

Examples of the di- or higher hydric phenol in the AO adduct (A27) of a di- or higher hydric phenol include C6-C16 polyhydric phenols such as bisphenol A, bisphenol S, and hydroquinone. An example of the AO adduct (A27) of a di- or higher hydric phenol is an AO adduct of the di- or higher hydric phenol described above. Examples of the AO include those exemplified in the description of the polyalkylene glycol (A1), and the same applies to preferred examples thereof.

Examples of the polyester polyol (A28) include condensates of polycarboxylic acids and polyols (e.g., the polyalkylene glycol (A1), the aliphatic diol (A21), the aliphatic polyol (A22), the AO adduct (A23) of the aliphatic diol (A21), the AO adduct (A24) of the aliphatic polyol (A22), the alicyclic polyol (A25), the AO adduct (A26) of the alicyclic polyol (A25), and the AO adduct (A27) of the di- or higher hydric phenol).

Examples of the polycarboxylic acid include: C2-C20 acyclic aliphatic polycarboxylic acids (e.g., oxalic acid, malonic acid, dipropylmalonic acid, succinic acid, 2,2-dimethyl succinic acid, glutaric acid, 2-methylglutaric acid, 2,2-dimethylglutaric acid, 2,4-dimethylglutaric acid, 3-methylglutaric acid, 3,3-dimethylglutaric acid, 3-ethyl-3-methylglutaric acid, adipic acid, 3-methyladipic acid, pimelic acid, 2,2,6,6-tetramethylpimelic acid, azelaic acid, sebacic acid, undecane diacid, dodecane diacid, pentadecane diacid, tetradecane diacid, heptadecane diacid, octadecane diacid, nonadecane diacid, and eicosanic diacid); C5-C20 alicyclic polycarboxylic acids (e.g., cyclopropanedicarboxylic acid, 1,4-cyclohexanedicarboxylic acid, cyclohexenedicarboxylic acid, dicyclohexyl-4,4'-dicarboxylic acid, and camphoric acid); and C8-C20 aromatic polycarboxylic acids (e.g., terephthalic acid, isophthalic acid, 2-methylterephthalic acid, 4,4-stilbenedicarboxylic acid, naphthalenedicarboxylic acid, 4,4-biphenyldicarboxylic acid, orthophthalic acid, and diphenyl ether dicarboxylic acid). Commercial products thereof, such as Kuraray Polyol P-2010 (Kurary Co., Ltd.), are available.

The polybutadiene polyol (A29) may be commercial products such as "G-1000", "G-2000", and "G-3000" (Nippon Soda Co., Ltd.).

The polybutadiene polyol (A29) may be a hydrogenated polybutadiene polyol, and commercial products of the hydrogenated polybutadiene polyol, such as "GI-1000", "GI-2000", and "GI-3000" (Nippon Soda Co., Ltd.), are available.

Examples of the polycarbonate polyol (A30) include products of reactions between phosgene and polyols (e.g., the polyalkylene glycol (A1), the aliphatic diol (A21), the aliphatic polyol (A22), the AO adduct (A23) of the aliphatic diol (A21), the AO adduct (A24) of the aliphatic polyol (A22), the alicyclic polyol (A25), the AO adduct (A26) of the alicyclic polyol (A25), and the AO adduct (A27) of the di- or higher hydric phenol). Commercial products thereof, such as Kuraray Polyol C-590 and Kuraray Polyol C-2090 (Kurary Co., Ltd.), are available.

From the viewpoint of excellent moldability in obtaining a molded article from the curable composition, for example, the different polyol (A2) to be used together with the polyalkylene glycol (A1) is preferably the aliphatic diol (A21), the aliphatic polyol (A22), the AO adduct (A23) of the aliphatic diol (A21), the AO adduct (A24) of the aliphatic polyol (A22), or the polycarbonate polyol (A30), more preferably an AO adduct of glycerol, an AO adduct of pentaerythritol, or a polycarbonate polyol which is a product of a reaction between 3-methyl-1,5-pentanediol, 1,6-hexanediol, and phosgene.

In the following description, the phrase "excellent moldability in obtaining a molded article from the curable composition" is sometimes simply referred to as "moldability". Herein, the phrase "excellent moldability" means ease of molding into a desired shape.

One of these polyols (A2) may be used alone or two or more of these may be used in combination.

From the viewpoint of excellent moldability, the polyol (A) preferably has at least two hydroxy groups per molecule on average.

From the viewpoint of excellent moldability, the polyol (A) preferably has a number average molecular weight of 1,000 to 10,000, more preferably 1,500 to 9,000.

Examples of the polyisocyanate (B) include acyclic aliphatic polyisocyanates, alicyclic polyisocyanates, aromatic polyisocyanates, and isocyanurates of these polyisocyanates.

Examples of the acyclic aliphatic polyisocyanates include C4-C20 acyclic aliphatic polyisocyanates. Preferred examples thereof include ethylene diisocyanate, tetramethylene diisocyanate, hexamethylene diisocyanate, dodecamethylene diisocyanate, 2,2,4-trimethylhexamethylene diisocyanate, and lysine diisocyanate.

Examples of the alicyclic polyisocyanates include C6-C17 alicyclic polyisocyanates. Preferred examples thereof include isophorone diisocyanate, 4,4-dicyclohexylmethane diisocyanate, cyclohexylene diisocyanate, methylcyclohexylene diisocyanate, bis(2-isocyanatoethyl) cyclohexene-1,2-dicarboxylate, and 2,5- or 2,6-norbornane diisocyanate. Commercial products of the alicyclic polyisocyanates, such as Desmodur I (Sumika Covestro Urethane Co., Ltd.), are available.

Examples of the aromatic polyisocyanates include C8-C22 aromatic polyisocyanates. Preferred examples thereof include 1,3- or 1,4-phenylene diisocyanate, 2,4- or 2,6-tolylene diisocyanate (TDI), 4,4'- or 2,4'-diphenylmethane diisocyanate (MDI), m- or p-isocyanatophenylsulfonyl isocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m- or p-isocyanatophenylsulfonyl isocyanate, m- or p-xylylene diisocyanate (XDI), and α,α,α',α'-tetramethylxylylene diisocyanate (TMXDI).

Examples of the isocyanurates of the polyisocyanates include trimers of polyisocyanates (e.g., the acyclic aliphatic polyisocyanates, the alicyclic polyisocyanates, and the aromatic polyisocyanates).

Commercial products of the isocyanurates of the polyisocyanates, such as "TLA-100" (Asahi Kasei Corp.), are available.

From the viewpoint of excellent moldability, preferred among the polyisocyanates (B) are the acyclic aliphatic polyisocyanates, the alicyclic polyisocyanates, the isocyanurates of the acyclic aliphatic polyisocyanates, and the isocyanurates of the alicyclic polyisocyanates.

One of these polyisocyanates (B) may be used alone or two or more of these may be used in combination.

The total weight percentage of the polyol (A) and the polyisocyanate (B) in the curable composition is preferably 3 to 30% by weight, more preferably 3 to 20% by weight, based on the weight of the curable composition.

The isocyanate index of the polyisocyanate (B) based on the polyol (A) (i.e., a total number of moles of isocyanate groups of the polyisocyanate (B)/a total number of moles of hydroxy groups of the polyol (A)) is 0.2 to 1.0, more preferably 0.5 to 0.8. An isocyanate index within the above range leads to good curability of the curable composition and good flexibility of the cured product.

The curable composition of the present invention contains at least one dispersant (C) for inorganic fillers selected from the group consisting of a phosphate ester (C1), a C12-C24 fatty acid (C2), a sucrose fatty acid ester (C3), a sorbitan fatty acid ester (C4), and a glycerol fatty acid ester (C5), the phosphate ester (C1) being represented by the following formula (1):

[Chem. 3]

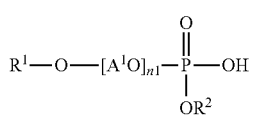
(1)

wherein $R^1$ is a hydrogen atom, a C2-C18 alkyl group, or a C2-C18 alkenyl group; $A^1O$ is a C2-C3 alkyleneoxy group; n1 is an integer of 3 to 15; and $R^2$ is a hydrogen atom or $-(A^2O)_{n2}R^3$, where $R^3$ is a C2-C18 alkyl group or a C2-C18 alkenyl group; $A^2O$ is a C2-C3 alkyleneoxy group; and n2 is an integer of 3 to 15.

In the formula (1) of the phosphate ester (C1), $R^1$ is a hydrogen atom, a C2-C18 alkyl group, or a C2-C18 alkenyl group.

Examples of the C2-C18 alkyl group include ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl groups. These may be linear or branched.

Examples of the C2-C18 alkenyl group include ethenyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl groups. These may be linear or branched. The position of the double bond is not limited.

$R^1$ may be linear or branched, and is preferably linear. From the viewpoint of factors such as the mechanical strength of the cured product of the curable composition and inorganic filler dispersibility, $R^1$ is preferably a C12-C18 alkyl group.

In the formula (1), $A^1O$ means a C2-C3 alkyleneoxy group, and examples thereof include an ethyleneoxy group and a propyleneoxy group. Preferred among these is an ethyleneoxy group from the viewpoint of dispersibility.

The n1 is an integer of 3 to 15. From the viewpoint of good inorganic filler dispersibility and good mechanical strength of the cured product, n1 is preferably 3 to 13, more preferably 4 to 11.

$R^2$ is a hydrogen atom or $-(A^2O)_{n2}R^3$, where $R^3$ is a C2-C18 alkyl group or a C2-C18 alkenyl group; $A^2O$ is a C2-C3 alkyleneoxy group; and n2 is an integer of 3 to 15.

Examples of $R^3$ include those of $R^1$, and the same applies to preferred examples thereof.

Examples of $A^2O$ include those of $A^1O$, and the same applies to preferred examples thereof.

When $R^2$ is a hydrogen atom, the compound of the formula (1) is a monoester. When $R^2$ is $-(A^2O)_{n2}R^3$, the compound of the formula (1) is a diester. When $R^2$ is $-(A^2O)_{n2}R^3$, $R^1$ and $R^3$ may be the same as or different from each other. The n1 and n2 may be the same as or different from each other.

The phosphate ester (C1) represented by the formula (1) may be a mixture of two or more phosphate esters different in $R^1$ and may be a mixture of a monoester ($R^2$ is H) and a diester ($R^2$ is $-(A^2O)_{n2}R^3$). The phosphate ester (C1) represented by the formula (1) is generally obtained as a mixture of a monoester and a diester (a mono-di mixture). Salts (e.g., metal salts such as sodium, potassium, or magnesium salts and ammonium salts) of the phosphate ester represented by the formula (1) may also be usable.

Preferred examples of the phosphate ester (C1) represented by the formula (1) include alkyl ether phosphate esters and alkyl phosphate esters, with alkyl ether phosphate esters being more preferred.

The phosphate ester (C1) represented by the formula (1) can be obtained by phosphate esterification of polyethers and phosphorus oxide. Commercial products thereof, such as DISPARLON DA-375 (Kusumoto Chemicals, Ltd.), PLYSURF A208N (Dai-Ichi Kogyo Seiyaku Co., Ltd.), PHOSPHANOL RL-210 (Toho Chemical Industry Co., Ltd., RI, $R^3$: $C_{18}H_{37}$, mono-di mixture, n1, n2: 2), PHOSPHANOL RS-710 (Toho Chemical Industry Co., Ltd., $R^1$, $R^3$: C12-C15 alkyl group, mono-di mixture, n1, n2: 9), and PHOSPHANOL RS-410 (Toho Chemical Industry Co., Ltd., $R^1$, $R^3$: C12-C15 alkyl group, mono-di mixture, n1, n2: 3), are available.

Examples of the C12-C24 fatty acid (C2) include C12-C24 saturated fatty acids (e.g., dodecanoic acid, hexadecanoic acid, eicosanoic acid, and tetracosanoic acid) and C12-C24 unsaturated fatty acids (e.g., hexadecenoic acid, octadecenoic acid, and octadecadienoic acid). Preferred is hexadecenoic acid (oleic acid).

Examples of the sucrose fatty acid ester (C3) include esters of sucrose and C8-C22 fatty acids. Specific examples thereof include sucrose stearate esters (e.g., DK ESTER F-50 (HLB=6), DK ESTER F-70 (HLB=8), and DK ESTER F-110 (HLB=11), which are available from Dai-Ichi Kogyo Seiyaku Co., Ltd., and RYOTO Sugar Ester S-770 (HLB=about 7), RYOTO Sugar Ester S-970 (HLB=about 9), RYOTO Sugar Ester S-1170 (HLB=about 11), and RYOTO Sugar Ester S-1170F (HLB=about 11), which are available from Mitsubishi Chemical Corporation).

Examples of the sorbitan fatty acid ester (C4) include mono-, di-, or tri-esters of sorbitan and C8-C22 fatty acids. Specific examples thereof include sorbitan palmitate (e.g., RHEODOL SP-P10 (HLB=6.7) available from Kao Corporation and RIKEMAL P-300 (HLB=5.6) available from Riken Vitamin Co., Ltd.), sorbitan oleate monoester, fatty acid sorbitan ester (IONET S-80 available from Sanyo Chemical Industries, Ltd.), and polyoxyethylene sorbitan fatty acid ester (IONET T-60V available from Sanyo Chemical Industries, Ltd.).

Examples of the glycerol fatty acid ester (C5) include mono-, di-, or tri-esters of glycerol or polyglycerol (degree of polymerization of 2 to 20) and C8-C22 fatty acids. Specific examples thereof include diglycerol monolaurate (e.g., Poem DL-100 (HLB=9.4) available from Riken Vitamin Co., Ltd.), diglycerol monomyristate (e.g., Poem DM-100 (HLB=8.7) available from Riken Vitamin Co., Ltd.), diglycerol monostearate (e.g., Poem DS-100A (HLB=7.7) available from Riken Vitamin Co., Ltd.), diglycerol monooleate (e.g., Poem DO-100V (HLB=7.3) and RIKEMAL DO-100 (HLB=7.4), which are available from Riken Vitamin Co., Ltd.), and decaglycerol stearate (e.g., Poem J-0081HV (HLB=12) and Poem J-0381V (HLB=12) available from Riken Vitamin Co., Ltd.).

Among the sucrose fatty acid ester (C3), the sorbitan fatty acid ester (C4), and the glycerol fatty acid ester (C5), the sorbitan fatty acid ester (C4) is preferred, with sorbitan oleate monoester being more preferred.

From the viewpoint of the dispersibility of the inorganic filler (D) and moldability, the total weight percentage of the phosphate ester (C1) and the C12-C24 fatty acid (C2) is preferably 1 to 5% by weight, more preferably 1 to 3% by weight, still more preferably 1 to 2% by weight, based on the weight of the curable composition.

From the viewpoint of the dispersibility of the inorganic filler (D) and moldability, the total weight percentage of the sucrose fatty acid ester (C3), the sorbitan fatty acid ester (C4), and the glycerol fatty acid ester (C5) is preferably 1 to 5% by weight, more preferably 1 to 3% by weight, still more preferably 1 to 2% by weight, based on the weight of the curable composition.

From the viewpoint of the dispersibility of the inorganic filler (D), the dispersant (C) for inorganic fillers preferably contains at least one selected from the group consisting of the phosphate ester (C1) and the C12-C24 fatty acid (C2) and at least one selected from the group consisting of the sucrose fatty acid ester (C3), the sorbitan fatty acid ester (C4), and the glycerol fatty acid ester (C5).

The total weight of the dispersant (C) for inorganic fillers is 1 to 5 parts by weight, preferably 1 to 3 parts by weight, still more preferably 1 to 2 parts by weight, per 100 parts by weight of the inorganic filler (D). When the total weight of the dispersant (C) for inorganic fillers is 1 to 5 parts by weight per 100 parts by weight of the inorganic filler (D), excellent dispersibility of the inorganic filler (D) and excellent moldability are achieved. When the total weight is less than 1 part by weight, the inorganic filler may be poorly dispersed, while when the total weight is more than 5 parts by weight, the moldability may deteriorate.

Examples of the inorganic filler (D) include particles of silicates (e.g., talc, clay, mica, and glass), particles of metal oxides (e.g., titanium oxide, alumina, silica, and magnesium oxide), particles of metal carbonates (e.g., calcium carbonate, magnesium carbonate, and hydrotalcite), particles of metal hydroxides (e.g., aluminum hydroxide, magnesium hydroxide, and calcium hydroxide), particles of metal sulfates (sulfites) (e.g., barium sulfate, calcium sulfate, and calcium sulfite), particles of metal borates (e.g., zinc borate, barium metaborate, aluminum borate, calcium borate, and sodium borate), particles of metal nitrides (e.g., aluminum nitride, boron nitride, and silicon nitride), and particles of metals (e.g., gold, silver, copper, and alloys containing any of these).

Preferred among these are inorganic fillers having a thermal conductivity of 0.5 to 200 W/m·K, more preferably 1 to 200 W/m·K, particularly preferably 10 to 200 W/mK. A cured product of the curable composition containing an inorganic filler having a thermal conductivity within the above range can be preferably used as a heat dissipation component.

From the viewpoint of factors such as good heat dissipation in the use of a cured product of the curable composition as a heat dissipation component, for example, the inorganic filler (D) is preferably any of metals, metal oxides, metal nitrides, metal hydroxides, and metal carbonates, more preferably any of metal oxides, particularly preferably magnesium oxide or alumina. Each of these may be used alone or in combination of two or more.

The inorganic filler (D) may have any shape. The inorganic filler (D) in the form of fibers or particles can be preferably used. When in the form of particles, the inorganic filler (D) in the form of spherical particles, plate-like particles, needle-like particles, or uneven particles (obtained by, for example, crushing) may be usable, for example. From the viewpoint of excellent moldability, the inorganic filler (D) is preferably in the form of spherical particles.

When the inorganic filler (D) is in the form of spherical particles, the inorganic filler (D) preferably has a volume average particle size (D50: the particle size at which the cumulative particle volume in the volume-based particle size distribution is 50%) of 0.01 to 200 μm, more preferably 0.1 to 150 μm, from the viewpoint of factors such as excellent moldability.

The volume average particle size of the inorganic filler (D) can be measured using a laser diffraction particle size distribution measuring device (e.g., SALD-2000A available from Shimadzu Corporation and LA-920 available from HORIBA, Ltd.). When components other than the inorganic filler (D) are soluble in a solvent, the measurement may be performed using a solution of the composition.

From the viewpoint of thermal conductivity and the flexibility of the molded product, preferably, the inorganic filler (D) in the curable composition contains particles each having a particle size of 1 μm or smaller in a particle size distribution curve (volume basis, horizontal axis: log particle size (μm), vertical axis: frequency (%)) obtained by measurement using a laser diffraction particle size distribution measuring device. The particles each having a particle size of 1 μm or smaller preferably have a total frequency of 10% or lower, particularly preferably 1 to 5.5%.

The total frequency of the particles each having a particle size of 1 μm or smaller is a value of the sum of frequencies of each of particle sizes of particles having a particle size of 1 μm or smaller in a particle size distribution curve (volume basis, horizontal axis: log particle size (μm), vertical axis: frequency (%)). In other words, the total frequency is a cumulative frequency at a particle size of 1 μm.

Such an inorganic filler (D) may be a mixture of two or more inorganic fillers with different volume average particle sizes. An example thereof is a mixture of an inorganic filler having a volume average particle size of smaller than 1 μm and an inorganic filler having a volume average particle size of 1 μm or larger. When the inorganic filler (D) contains an inorganic filler having a volume average particle size of smaller than 1 μm, the amount of the inorganic filler having a volume average particle size of smaller than 1 μm is preferably 1 to 10% by weight, more preferably 3 to 7% by weight, based on the total weight of the inorganic filler (D).

The inorganic filler (D) preferably contains, as an inorganic filler having a volume average particle size of 1 μm or larger, an inorganic filler (Da) having a volume average particle size of 1 to 10 μm and an inorganic filler (db) having a volume average particle size of 10 to 100 μm. The weight ratio between the inorganic filler (Da) and the inorganic filler (db) (Da:db) is preferably 10:90 to 90:10, more preferably 20:80 to 80:20, particularly preferably 30:70 to 70:30.

The curable composition contains the inorganic filler (D) in an amount of 70 to 97% by weight, preferably 80 to 97% by weight, based on the weight of the curable composition. When containing the inorganic filler (D) in an amount of 70% by weight or more, a cured product of the curable composition has good thermal conductivity. When containing the inorganic filler (D) in an amount of 97% by weight or less, the curable composition has better moldability. When containing the inorganic filler (D) in an amount of less than 70% by weight, the cured product may have insufficient thermal conductivity. When containing the inorganic filler (D) in an amount of more than 97% by weight, the curable composition may have poor moldability.

The curable composition according to the first embodiment may contain a different component other than the polyol (A), the polyisocyanate (B), the dispersant (C) for inorganic fillers, and the inorganic filler (D). Examples of the different component include a surfactant (E), a plasticizer (F), and a urethane-forming catalyst (G). The curable composition may further contain as a different component known additives used for urethane resins (e.g., antioxidants and ultraviolet absorbers described in JP 2018-076537 A).

The surfactant (E) usable may preferably be a polyoxyalkylene nonionic surfactant (E1), an ester nonionic surfactant (E2), an anionic surfactant (E3), or a cationic surfactant (E4).

Examples of the polyoxyalkylene nonionic surfactant (E1) include AO adducts, preferably adducts with 1 to 30 mol of AO, of aliphatic alcohols (C4-C30), alkyl (C1-C30) phenols, aliphatic (C4-C30) amines, or aliphatic (C4-C30) amides.

Examples of the aliphatic alcohols constituting the polyoxyalkylene nonionic surfactants (E1) include n-, i-, sec-, or t-butanol, octanol, and dodecanol. Preferred examples of the alkyl phenols include phenol, methylphenol, and nonylphenol. Preferred examples of the aliphatic amines include laurylamine and methylstearylamine. Examples of the aliphatic amides include stearic acid amide.

Examples of the ester nonionic surfactant (E2) include ester compounds of C4-C30 fatty acids (e.g., lauric acid, stearic acid, and oleic acid) and polyhydric alcohols other than sucrose, sorbitol, and glycerol.

Examples of the anionic surfactant (E3) include carboxylate surfactants, sulfate ester surfactants, and sulfonate surfactants.

Examples of the carboxylate surfactants include alkali metal salts of the C4-C30 fatty acids and alkali metal salts of polyoxyalkylene alkyl ether carboxylic acids. Examples of the sulfate ester surfactants include alkali metal salts of sulfate esters of the C4-C30 aliphatic alcohols and alkali metal salts of sulfate esters of AO adducts of the C4-C30 aliphatic alcohols. Examples of the sulfonate surfactants include alkali metal sulfonate salts of alkyl phenols. Commercial products thereof, such as polyether carboxylic acid (KAOAKYPO RLM-100 available from Kao Corporation), are available.

Examples of the cationic surfactant (E4) include primary, secondary, or tertiary amine salt surfactants and quaternary ammonium salt surfactants.

Examples of the primary, secondary, or tertiary amine salt surfactants include hydrochlorides of C4-C30 aliphatic amines (e.g., primary amine such as laurylamine, secondary amine such as dibutylamine, and tertiary amine such as dimethylstearylamine), and inorganic acid (e.g., hydrochloric acid, sulfuric acid, nitric acid, or phosphoric acid) salts of monoesters of triethanolamine and C4-C30 fatty acids. Examples of the quaternary ammonium salt surfactants include inorganic acid salts of C4-C30 quaternary ammoniums (e.g., butyltrimethylammonium, diethyllaurylmethylammonium, and dimethyldistearylammonium). Commercial products thereof, such as Nopcosperse 092 (cationic surfactant available from San Nopco Limited), are available.

Examples of the plasticizer (F) include phthalic acid plasticizers (e.g., diisononyl phthalate, di-(2-ethylhexyl) phthalate, diisodecyl phthalate, and butyl benzyl phthalate), fatty acid ester plasticizers (e.g., di-(2-ethylhexyl) adipate, di-n-decyl adipate, di-(2-ethylhexyl) azelate, dibutyl sebacate, and di-(2-ethylhexyl) sebacate), phosphate ester plasticizers (e.g., tributyl phosphate, tri-(2-ethylhexyl) phosphate, and 2-ethylhexyl diphenyl phosphate), benzoic acid plasticizers (e.g., polyethylene glycol benzoate esters), epoxy plasticizers (e.g., epoxidized soybean oil), trimellitate plasticizers, pyromellitate plasticizers, polyester plasticizers, and sulfonate ester plasticizers. Commercial products thereof, such as diisononyl phthalate (DINP available from Aekyung Petrochemical) and polyethylene glycol benzoate esters (EB-300 available from Sanyo Chemical Industries, Ltd.), are available.

Examples of the urethane-forming catalyst (G) include amine catalysts (e.g., triethylenediamine, N-ethylmorpholine, diethylethanolamine, and 1,8-diazabicyclo (5,4,0) undecene-7) and metal catalysts (e.g., bismuth tris(2-ethylhexanoate), stannous octoate, dibutyltin dilaurate, and octanoic acid lead salt). Commercial products thereof, such as an inorganic bismuth catalyst (NEOSTANN U-600 available from Nitto Kasei Co., Ltd.), are available.

When the curable composition according to the first embodiment contains the surfactant (E), the amount of the surfactant (E) per 100 parts by weight of the inorganic filler (D) is preferably 0.001 to 30 parts by weight, still more preferably 0.01 to 10 parts by weight, particularly preferably 0.1 to 5 parts by weight.

When the curable composition according to the first embodiment contains the plasticizer (F), the amount of the plasticizer (F) per 100 parts by weight of the total weight of the polyol (A) and the polyisocyanate (B) is preferably 25 parts by weight or less, more preferably 1 to 25 parts by weight, particularly preferably 5 to 20 parts by weight.

When the curable composition according to the first embodiment contains the urethane-forming catalyst (G), the amount of the urethane-forming catalyst (G) per 100 parts by weight of the total weight of the polyol (A) and the polyisocyanate (B) is preferably 3 parts by weight or less, more preferably 0.001 to 3 parts by weight, particularly preferably 0.005 to 3 parts by weight.

The curable composition according to the first embodiment is obtainable by homogeneously mixing the polyol (A), the polyisocyanate (B), the dispersant (C) for inorganic fillers, the inorganic filler (D), and optionally a different component (e.g., the surfactant (E), the plasticizer (F), and the urethane-forming catalyst (G)) using a known mixer (e.g., a mixing tank with a stirrer).

In the production of the curable composition, the components may be mixed at once; or any two or more of the components may be pre-mixed, and the resulting mixture may be mixed with the remaining components (the remaining components may be in the form of a mixture).

The curable composition according to the first embodiment is subjected to a urethane forming reaction on any substrate or in a mold having a desired shape by a known method. Thus, a cured product can be obtained.

Second Embodiment

A curable composition according to the second embodiment contains a polyol (A), a polyisocyanate (B), a dispersant (C) for inorganic fillers, and an inorganic filler (D) in two formulations as a first agent and a second agent. The composition immediately after mixing the first agent and the second agent is less fluid and highly adheres to a substrate. In this viewpoint, the second embodiment is preferred.

In an embodiment of the second embodiment (hereinafter referred to as "embodiment A"), the inorganic filler (D) includes a first inorganic filler (D1) contained in the first agent and a second inorganic filler (D2) contained in the second agent, the first agent contains the polyol (A), the dispersant (C) for inorganic fillers, and the first inorganic filler (D1), and the second agent contains the polyisocyanate (B) and the second inorganic filler (D2).

The following describes the second embodiment, focusing on the embodiment A.

The polyol (A), the dispersant (C) for inorganic fillers, and the first inorganic filler (D1) in the first agent in the curable composition according to the embodiment A may be the same as the polyol (A), the dispersant (C) for inorganic fillers, and the inorganic filler (D) described for the first embodiment, and the same applies to preferred examples thereof.

Also in the second embodiment, the weight percentage of the polyalkylene glycol (A1) in the polyol (A) is 50% by weight or more, preferably 70 to 100% by weight, still more preferably 90 to 100% by weight, based on the weight of the polyol (A). When the weight percentage of the polyalkylene glycol (A1) in the polyol (A) is 50% by weight or more, the amount of inorganic filler in the curable composition may be increased, and a cured product of the curable composition can be easily produced. When the weight percentage of the polyalkylene glycol (A1) in the polyol (A) is less than 50% by weight based on the weight of the polyol (A), it is hard to increase the amount of inorganic filler in the curable composition and to obtain a cured product of the curable composition.

Also in the second embodiment, the total weight of the dispersant (C) for inorganic fillers is 1 to 5 parts by weight, preferably 1 to 3 parts by weight, still more preferably 1 to 2 parts by weight, per 100 parts by weight of the total weight of the inorganic filler (D). When the total weight of the dispersant (C) for inorganic fillers is 1 to 5 parts by weight per 100 parts by weight of the inorganic filler (D), excellent dispersibility of the inorganic filler and excellent moldability are achieved. When the total weight is less than 1 part by weight, the inorganic filler may be poorly dispersed, while when the total weight is more than 5 parts by weight, the moldability may deteriorate.

Also in the second embodiment, the curable composition contains the inorganic filler (D) in an amount of 70 to 97% by weight, preferably 80 to 97% by weight, based on the weight of the curable composition. When containing the inorganic filler (D) in an amount of 70% by weight or more, a cured product of the curable composition has good thermal conductivity. When containing the inorganic filler (D) in an amount of 97% by weight or less, the curable composition has better moldability. When containing the inorganic filler (D) in an amount of less than 70% by weight, the cured product may have insufficient thermal conductivity. When containing the inorganic filler (D) in an amount of more than 97% by weight, the curable composition may have poor moldability. In the second embodiment, the weight of the curable composition means a sum of the weights of the first agent and the second agent.

The amount of the first inorganic filler (D1) in the first agent is preferably 70 to 97% by weight, more preferably 80 to 97% by weight, still more preferably 85 to 95% by weight, based on the weight of the first agent. When the amount of the first inorganic filler (D1) in the first agent is 70% by weight or more, a cured product prepared by mixing the first agent and the second agent and curing the mixture has better thermal conductivity. When the amount of the first inorganic filler (D1) in the first agent is 97% by weight or less, a cured product prepared by mixing the first agent and the second agent and curing the mixture has better flexibility.

The total weight percentage of the phosphate ester (C1) and the C12-C24 fatty acid (C2) is preferably 1 to 5% by weight, more preferably 1 to 3% by weight, still more preferably 1 to 2% by weight, based on the weight of the curable composition (i.e., the sum of the weights of the first agent and the second agent). When the percentage is 1% by weight or more, the inorganic filler (D) is better dispersed. When the percentage is 5% by weight or less, a cured product can be obtained with better moldability by mixing the first agent and the second agent and curing the mixture.

The total weight percentage of the sucrose fatty acid ester (C3), the sorbitan fatty acid ester (C4), and the glycerol fatty acid ester (C5) is preferably 1 to 5% by weight, more preferably 1 to 3% by weight, still more preferably 1 to 2% by weight, based on the weight of the curable composition (i.e., the sum of the weights of the first agent and the second agent). When the percentage is 1% by weight or more, the inorganic filler (D) is better dispersed. When the percentage is 5% by weight or less, a cured product can be obtained with better moldability by mixing the first agent and the second agent and curing the mixture.

Also in the second embodiment, from the viewpoint of the dispersibility of the inorganic filler (D), the dispersant (C) for inorganic fillers preferably contains at least one selected from the group consisting of the phosphate ester (C1) and the C12-C24 fatty acid (C2) and at least one selected from the group consisting of the sucrose fatty acid ester (C3), the sorbitan fatty acid ester (C4), and the glycerol fatty acid ester (C5).

The total weight of the dispersant (C) for inorganic fillers in the first agent is preferably 1 to 8 parts by weight, more preferably 1 to 6 parts by weight, still more preferably 1 to 5 parts by weight, per 100 parts by weight of the first inorganic filler (D1). When the total weight of the dispersant (C) for inorganic fillers is 1 part by weight or more per 100 parts by weight of the first inorganic filler (D1), the inorganic filler (D) can be better dispersed, and a cured product having better thermal conductivity can be obtained with better moldability by mixing the first agent and the second agent and curing the mixture. When the total weight of the dispersant (C) for inorganic fillers is 8 parts by weight or less per 100 parts by weight of the first inorganic filler (D1), a cured product obtained by mixing the first agent and the second agent and curing the mixture can have higher strength.

The polyisocyanate (B) and the second inorganic filler (D2) in the second agent may be the same as the polyisocyanate (B) and the inorganic filler (D) described for the first embodiment, and the same applies to preferred examples thereof. The first inorganic filler (D1) and the second inorganic filler (D2) may be the same as or different from each other. The case where the first inorganic filler (D1) and the second inorganic filler (D2) are different from each other encompasses the case where the first inorganic filler (D1) and the second inorganic filler (D2) contain the same combination of two or more inorganic fillers and only the ratios of the two or more inorganic fillers are different.

The amount of the second inorganic filler (D2) in the second agent is preferably 70 to 97% by weight, more preferably 80 to 95% by weight, still more preferably 85 to 95% by weight, based on the weight of the second agent. When the amount of the second inorganic filler (D2) in the second agent is 70% by weight or more, a cured product having better thermal conductivity can be obtained by mixing the first agent and the second agent and curing the mixture. When the amount of the second inorganic filler (D2) in the second agent is 97% by weight or less, a cured product having better flexibility can be obtained by mixing the first agent and the second agent and curing the mixture.

The isocyanate index of the polyisocyanate (B) in the second agent based on the polyol (A) in the first agent is preferably 0.2 to 1.0, more preferably 0.5 to 0.8. An isocyanate index within the above range leads to good curability of the curable composition and good flexibility of the cured product.

The total weight percentage of the polyol (A) and the polyisocyanate (B) is preferably 3 to 30% by weight, more preferably 3 to 20% by weight, based on the weight of the curable composition (i.e., the sum of the weights of the first agent and the second agent).

In the curable composition according to the second embodiment, the weight ratio of the second agent to the first agent (second agent/first agent) is preferably 1/10 to 10/1, more preferably 1/4 to 4/1, still more preferably 1/3 to 2/1. When the weight ratio of the second agent to the first agent (second agent/first agent) is 1/10 or higher, a cured product obtainable by mixing the first agent and the second agent can have good strength. When the weight ratio is 10/1 or lower, the cured product can have better curability.

The first agent and the second agent may contain a different component (e.g., the surfactant (E), the plasticizer (F), and the urethane-forming catalyst (G)) other than the polyol (A), the polyisocyanate (B), the dispersant (C) for inorganic fillers, and the inorganic filler (D) exemplified in the description of the curable composition according to the first embodiment.

When the first agent and/or the second agent contains the surfactant (E), the total amount of the surfactant (E) per 100 parts by weight of the inorganic filler (D) in the curable composition is preferably 0.001 to 30 parts by weight, still more preferably 0.01 to 10 parts by weight, particularly preferably 0.1 to 5 parts by weight.

When the first agent and/or the second agent contains the plasticizer (F), the total amount of the plasticizer (F) per 100 parts by weight of the total weight of the polyol (A) and the polyisocyanate (B) is preferably 25 parts by weight or less, more preferably 1 to 25 parts by weight, particularly preferably 5 to 20 parts by weight.

When the first agent and/or the second agent contains the urethane-forming catalyst (G), the total amount of the urethane-forming catalyst (G) per 100 parts by weight of the total weight of the polyol (A) and the polyisocyanate (B) is preferably 3 parts by weight or less, more preferably 0.001 to 3 parts by weight, particularly preferably 0.005 to 3 parts by weight.

The first agent in the embodiment A is obtainable by homogeneously mixing the polyol (A), the dispersant (C) for inorganic fillers, the first inorganic filler (D1), and optionally a different component (e.g., the surfactant (E), the plasticizer (F), and the urethane-forming catalyst (G)) using a known mixer (e.g., a mixing tank with a stirrer). The components may be mixed at once; or any two or more of the components may be pre-mixed, and the resulting mixture may be mixed with the remaining components (the remaining components may be in the form of a mixture).

The second agent in the embodiment A is obtainable by homogeneously mixing the polyisocyanate (B), the second inorganic filler (D2), and optionally a different component (e.g., the surfactant (E), the plasticizer (F), and the urethane-forming catalyst (G)) using a known mixer (e.g., a mixing tank with a stirrer). The components may be mixed at once; or any two or more of the components may be pre-mixed, and the resulting mixture may be mixed with the remaining components (the remaining components may be in the form of a mixture).

The curable composition according to the second embodiment is mixed with the first agent and the second agent and the resulting mixture is subjected to a urethane forming reaction on any substrate or in a mold having a desired shape by a known method. Thus, a cured product can be obtained.

The first agent and the second agent may be mixed manually or using a known mixing device (e.g., a container with a stirrer), or may be mixed continuously using a known two-liquid mixing and feeding device.

(2. Urethane Resin)

The urethane resin of the present invention is a reaction product of the curable composition of the present invention. The urethane resin of the present invention is a urethane resin obtainable by curing the curable composition according to the first embodiment or the second embodiment by known methods.

The urethane resin of the present invention is a urethane resin containing the inorganic filler (D) and having excellent flexibility. Such a urethane resin of the present invention can exhibit functions, regardless of its shape, according to the functions of the inorganic filler (D) in applications such as electromagnetic shielding, semiconductor devices (e.g., CPU), LED backlights, and batteries. In particular, use of an inorganic filler selected from the group consisting of metals, metal oxides, metal nitrides, metal hydroxides, and metal carbonates as the inorganic filler (D) allows the urethane resin to have excellent flexibility and excellent thermal conductivity.

When an inorganic filler selected from the group consisting of metals, metal oxides, metal nitrides, metal hydroxides, and metal carbonates is used as the inorganic filler (D), the urethane resin is preferably in the form of a membrane such as a film or a sheet.

(3. Heat Dissipation Component)

The heat dissipation component of the present invention contains the urethane resin of the present invention. The heat dissipation component of the present invention may include the urethane resin of the present invention and a heat receiving component. The urethane resin of the present invention itself may be used as a heat dissipation component.

When the heat dissipation component of the present invention includes the urethane resin of the present invention and a heat receiving component, the heat receiving component is, for example, a graphite sheet or a sheet substrate made of gold, silver, copper, aluminum, nickel, iron, tin, or any of alloys of these metals.

Preferably, in the heat dissipation component of the present invention, the urethane resin of the present invention and the heat receiving component are adhered to each other from the viewpoint of heat dissipation ability.

When the heat dissipation component of the present invention includes the urethane resin of the present invention and a heat receiving component, the heat dissipation component can be produced by applying the curable composition of the present invention to the heat receiving component and curing the curable composition or by stacking and bonding the heat receiving component and the urethane resin of the present invention that has been formed into a film. The urethane resin and the heat receiving component may be bonded using a known adhesive or the like. When a surface of the urethane resin has a tackiness, the heat receiving component may be adhered to a contact surface utilizing the tackiness of the urethane resin, without using an adhesive or the like.

The heat dissipation component of the present invention can be used for cooling heat generating components.

The heat generating component is a component to be cooled by the heat dissipation component. Specific examples thereof include semiconductor devices (e.g., CPU), LED backlights, batteries, and electric circuits including these components.

Preferably, when a heat dissipation component composed of the urethane resin of the present invention itself is used for cooling a heat generating component, the heat dissipation component of the present invention and the heat generating component are adhered to each other from the viewpoint of heat dissipation ability. The embodiment in which the heat dissipation component and the heat generating component are adhered to each other can be produced, for example, by applying the curable composition of the present invention to the heat generating component and curing the curable composition or by stacking and bonding the heat generating component and the urethane resin of the present invention that has been formed into a film. The urethane resin and the heat generating component may be bonded using a known adhesive or the like. When the urethane resin has tackiness, the heat generating component may be adhered to a contact surface utilizing the tackiness of the urethane resin, without using an adhesive or the like.

When the heat dissipation component includes the urethane resin of the present invention and a heat receiving component, the heat generating component and the heat receiving component are preferably bonded with the urethane resin of the present invention in between. For example, the heat receiving component is bonded to one or both sides of a heat generating component such as an electric circuit with the urethane resin in between.

EXAMPLES

Hereinafter, the present invention is specifically described with reference to examples but the present invention is not limited to these examples. In the following description, "parts" means "parts by weight". Components (A) to (G) used in the examples and comparative examples are shown in Table 1. In Table 1, NCO means isocyanate. In Table 1, "$R^1$, $R^3$: C12-C15 alkyl group, EO 9 mol added" in the column of the phosphate ester (c-1) component means that $R^1$ in the formula (1) is a C12-C15 alkyl group, $R^3$ is a C12-C15 alkyl group, $A^1O$ and $A^2O$ each represent a C2 alkyleneoxy group (ethyleneoxy group (EO)), and n1 and n2 each represent 9. In Table 1, "$R^1$, $R^3$: C12-C15 alkyl group, EO 3 mol added" in the column of the phosphate ester (c-2) component means that $R^1$ in the formula (1) is a C12-C15 alkyl group, $R^3$ is a C12-C15 alkyl group, $A^1O$ and $A^2O$ each represent a C2 alkyleneoxy group (ethyleneoxy group (EO)), and n1 and n2 each represent 3. The phosphate esters (c-1) and (c-2) are mixtures of monoesters and diesters.

TABLE 1

| | | | Component and properties | Product name | Manufacturer |
|---|---|---|---|---|---|
| Polyol (A) | Polyalkylene glycol (A1) | a1-1 | Polyoxypropylene glycol (Mn: 600, number of functional groups: 2) | SANNIX PP-600 | Sanyo Chemical Industries, Ltd. |
| | | a1-2 | Polyethylene glycol (Mn: 400, number of functional groups: 2) | PEG400 | (Reagent) |
| | Different polyol (A2) | a2-1 | Polycarbonate diol (Mw: 500, number of functional groups: 2) | Kuraray Polyol C-590 | Kuraray Co., Ltd. |
| | | a2-2 | Polyester polyol (Mw: 2000, number of functional groups: 2) | Kuraray Polyol P-2010 | Kuraray Co., Ltd. |
| | | a2-3 | Polyoxypropylene glyceryl ether (Mn: 1000, number of functional groups: 3) | SANNIX GP-1000 | Sanyo Chemical Industries, Ltd. |
| | | a2-4 | Polytetramethylene glycol (Mw: 2000, number of functional groups: 2) | PTMG 2000 | Mitsubishi Chemical Corp. |
| Polyisocyanate (B) | | b-1 | Hexamethylene diisocyanate trimer (NCO content: 23.2% by weight) | TLA-100 | Asahi Kasei Corporation |
| | | b-2 | Isophorone diisocyanate (NCO content: 37.8% by weight) | Desmodur I | Sumika Covestro Urethane Co., Ltd. |
| Dispersant (C) for inorganic fillers | Phosphate ester (C1) | c-1 | Polyoxyethylene alkyl ether phosphate ester ($R^1$, $R^3$: C12-C15 alkyl group, EO 9 mol added) | PHOSPHANOL RS-710 | Toho Chemical Industry Co., Ltd. |
| | | c-2 | Polyoxyethylene alkyl ether phosphate ester ($R^1$, $R^3$: C12-C15 alkyl group, EO 3 mol added) | PHOSPHANOL RS-410 | Toho Chemical Industry Co., Ltd. |
| | Sorbitan fatty acid ester (C4) | c-3 | Mono fatty acid sorbitan ester | IONET S-80 | Sanyo Chemical Industries, Ltd. |
| | | c-4 | Polyoxyethylene sorbitan fatty acid monoester | IONET T-60V | Sanyo Chemical Industries, Ltd. |
| Inorganic filler (D) | | d-1 | Spherical magnesium oxide (volume average particle size: 70 to 110 μm, thermal conductivity: 59 W/m · K) | RF-70C | Ube Material Industries, Ltd. |
| | | d-2 | Spherical magnesium oxide (volume average particle size: 4 to 10 μm, thermal conductivity: 59 W/m · K) | RF-10CS | Ube Material Industries, Ltd. |

TABLE 1-continued

| | | Component and properties | Product name | Manufacturer |
|---|---|---|---|---|
| | d-3 | Spherical alumina (volume average particle size: 75 μm, thermal conductivity: 30 W/m · K) | AZ75-150 | NIPPON STEEL Chemical & Material Co., Ltd. |
| | d-4 | Spherical alumina (volume average particle size: 5.5 μm, thermal conductivity: 30 W/m · K) | AZ4-75 | NIPPON STEEL Chemical & Material Co., Ltd. |
| | d-5 | Spherical alumina (volume average particle size: 2.5 μm, thermal conductivity: 30 W/m · K) | AZ2-75 | NIPPON STEEL Chemical & Material Co., Ltd. |
| | d-6 | Spherical alumina (volume average particle size: 0.3 μm, thermal conductivity: 30 W/m · K) | ASFP-20 | Denka Company Limited |
| Surfactant (E) | e-1 | Cationic surfactant | Nopcosperse 092 | San Nopco Limited |
| | e-2 | Polyether carboxylic acid | KAOAKYPO RLM-100 | Kao Corporation |
| Plasticizer (F) | f-1 | Diisononyl phthalate | DINP | Aekyung Petrochemical Co., Ltd |
| | f-2 | Polyethylene glycol benzoate ester | EB-300 | Sanyo Chemical Industries, Ltd. |
| Urethane-forming catalyst (G) | g-1 | Bismuth tris(2-ethylhexanoate) | NEOSTANN U-600 | Nitto Kasei Co., Ltd. |

Production of Compositions of Examples 1 to 5 and Comparative Examples 1 to 3

The components (A) to (G) were mixed according to the formulation shown in Table 2, whereby compositions of Examples 1 to 5 and compositions of Comparative Examples 1 to 3 were obtained.

Production of Urethane Resin Sheets of Examples 6 to 10 and Comparative Examples 4 to 6

The compositions of Examples 1 to 5 and the compositions of Comparative Examples 1 to 3 were used to produce urethane resin sheets (Examples 6 to 10) and comparative urethane resin sheets (Comparative Examples 4 to 6), respectively, by the following production method.

Each of the compositions of Examples 1 to 5 and Comparative Examples 1 to 3 was injected to fill a mold (1 cm (length)×1 cm (width)×0.2 cm (depth)), pressed by a pressing machine, and left to stand at 25° C. for 24 hours for reaction. The urethane resin sheets of Examples 6 to 10 were obtained from the compositions of Examples 1 to 5, respectively, and the urethane resin sheet of Comparative Example 6 was obtained from the composition of Comparative Example 3. In Comparative Example 4 in which the composition of Comparative Example 1 was used and in Comparative Example 5 in which the composition of Comparative Example 2 was used, the compositions could not be molded into urethane resin sheets.

The molded articles (the urethane resin sheets of Examples 6 to 10 and the urethane resin sheet of Comparative Example 6) were subjected to evaluation of thermal conductivity and flexibility by the following methods. The results are shown in Table 2. Comparative Examples 4 and 5 in which the resin sheets could not be obtained as described above and the thermal conductivity and flexibility could not be measured are expressed by "not measurable" in Table 2.

Production of Compositions of Examples 11 to 15 and Comparative Examples 7 to 9

A first agent and a second agent were prepared by mixing the components shown in Table 1 in amounts shown in Table 3. The first agent and second agent were then mixed until a homogeneous mixture was obtained. Thus, compositions of Examples 11 to 15 and compositions of Comparative Examples 7 to 9 were obtained.

Production of Urethane Resin Sheets of Examples 16 to 20 and Comparative Examples 10 to 12

The compositions of Examples 11 to 15 and the compositions of Comparative Examples 7 to 9 were used to produce urethane resin sheets (Examples 16 to 20) and comparative urethane resin sheets (Comparative Examples 10 to 12), respectively, by the following production method.

Each of the compositions of Examples 11 to 15 and Comparative Examples 7 to 9 was injected to fill a mold (1 cm (length)×1 cm (width)×0.2 cm (depth)), pressed by a pressing machine, and left to stand at 25° C. for 24 hours for reaction. The urethane resin sheets of Examples 16 to 20 were obtained from the compositions of Examples 11 to 15, respectively, and the urethane resin sheet of Comparative Example 12 was obtained from the composition of Comparative Example 9. In Comparative Example 10 in which the composition of Comparative Example 7 was used and in Comparative Example 11 in which the composition of Comparative Example 8 was used, the compositions could not be molded into urethane resin sheets.

The molded articles (the urethane resin sheets of Examples 16 to 20 and the urethane resin sheet of Comparative Example 12) were subjected to evaluation of thermal conductivity and flexibility by the following methods. The results are shown in Table 3. Comparative Examples 10 and 11 in which the resin sheets could not be obtained as described above and the thermal conductivity and flexibility could not be measured are expressed by "not measurable" in Table 3.

(Evaluation Method)

<Particle Size Distribution Curve of Inorganic Filler (D) Obtained with Laser Diffraction Particle Size Distribution Measuring Device>

Any one of the compositions (0.1 g) was dissolved in methanol (10 g) to prepare a sample for particle size distribution measurement. The prepared sample for measurement was subjected to measurement of particle size distribution using a laser diffraction particle size distribution measuring device (LA-920 available from HORIBA, Ltd.), and a particle size distribution curve (volume basis, horizontal axis: log particle size (μm), vertical axis: frequency (%)) was obtained.

In the particle size distribution curve obtained, the sum of the frequencies of the particles having a particle size of 1 μm or smaller was determined to calculate the total frequency of the particles having a particle size of 1 μm or smaller (a cumulative frequency at a particle size of 1 μm).

<Thermal Conductivity>

Any one of the urethane resin sheets was allowed to stand at 25° C. for two hours and then subjected to measurement of a thermal conductivity (unit: W/mK) by the laser flash method using a thermal conductivity meter "Xenon Flash Analyzer LFA447 NanoFlash, available from NETZSCH Japan K.K.". A higher thermal conductivity indicates better heat dissipation ability.

<Flexibility>

The urethane resin sheet that had been left to stand at 25° C. for two hours was subjected to measurement of hardness (Asker C hardness) at 25° C. in accordance with "7. Hardness test" of JIS K 7312:1996. The type of the test was Type C. The value obtained immediately after pressing a tester against the sheet was taken as C hardness. The following criteria were used to determine flexibility. A lower C hardness indicates better flexibility. The tables show the results of the determination and the measured values (in parentheses).

(Criteria for Flexibility)
  A: C hardness is 40 or less
  B: C hardness is 41 to 60
  C: C hardness is 60 or more

TABLE 2

| | Composition | | Example 1 | Example 2 | Example 3 | Example 4 | Example 5 |
|---|---|---|---|---|---|---|---|
| Formulation (parts by weight) | Polyalkylene glycol (A1) | a1-1 | 100 | — | — | — | 50 |
| | | a1-2 | — | 90 | 70 | 50 | — |
| | Different polyol (A2) | a2-1 | — | — | 30 | — | — |
| | | a2-2 | — | — | — | 50 | — |
| | | a2-3 | — | — | — | — | 50 |
| | | a2-4 | — | 10 | — | — | — |
| | Polyisocyanate (B) | b-1 | 30 | — | 50 | — | 30 |
| | | b-2 | — | 30 | — | 20 | — |
| | Dispersant (C) for inorganic fillers | c-1 | 20 | — | — | 45 | — |
| | | c-2 | — | 3 | — | — | 10 |
| | | c-3 | — | — | 40 | — | 10 |
| | | c-4 | — | 2 | — | 45 | — |
| | Inorganic filler (D) | d-1 | 350 | 280 | — | — | 1100 |
| | | d-2 | 88 | 120 | — | — | — |
| | | d-3 | — | — | 2600 | 1600 | — |
| | | d-4 | — | — | 928 | 400 | 392 |
| | | d-5 | — | — | — | — | — |
| | | d-6 | — | — | 186 | — | 79 |
| | Surfactant (E) | e-1 | 10 | — | 5 | — | 10 |
| | | e-2 | — | 10 | — | 5 | — |
| | Plasticizer (F) | f-1 | 10 | — | 5 | — | 5 |
| | | f-2 | — | 10 | — | 5 | 5 |
| | Urethane-forming catalyst (G) | g-1 | 2 | 2 | 2 | 2 | 2 |
| Component (D) content (% by weight) of composition | | | 71.8 | 71.8 | 94.8 | 90.0 | 90.1 |
| Cumulative frequency (%) of component (D) in composition at particle size of 1 μm in particle size distribution curve | | | 0.0 | 0.0 | 5.0 | 0.0 | 5.0 |
| Total amount (parts by weight) of component (C) per 100 parts by weight of component (D) | | | 4.6 | 1.3 | 1.1 | 4.5 | 1.3 |
| Component (A1) content (% by weight) of component (A) | | | 100 | 90 | 70 | 50 | 50 |
| Isocyanate index (NCO/OH) | | | 0.50 | 0.59 | 0.59 | 0.60 | 0.52 |
| Urethane resin | | | Example 6 | Example 7 | Example 8 | Example 9 | Example 10 |
| Thermal Conductivity (W/m · K) | | | 1.3 | 1.5 | 6.1 | 2.4 | 2.5 |
| Flexibility (C hardness) | | | A(15) | A(20) | A(38) | A(36) | A(30) |

| | Composition | | Comparative Example 1 | Comparative Example 2 | Comparative Example 3 |
|---|---|---|---|---|---|
| Formulation (parts by weight) | Polyalkylene glycol (A1) | a1-1 | 45 | — | 50 |
| | | a1-2 | — | 45 | — |
| | Different polyol (A2) | a2-1 | — | — | — |
| | | a2-2 | — | — | — |
| | | a2-3 | — | — | — |
| | | a2-4 | 55 | 55 | 50 |
| | Polyisocyanate (B) | b-1 | 20 | — | 30 |
| | | b-2 | — | 25 | — |
| | Dispersant (C) for inorganic fillers | c-1 | 8 | — | — |
| | | c-2 | — | 5 | — |
| | | c-3 | 7 | — | — |
| | | c-4 | 8 | 5 | — |
| | Inorganic filler (D) | d-1 | 150 | — | — |
| | | d-2 | 150 | — | — |
| | | d-3 | — | 4500 | 210 |
| | | d-4 | — | 1929 | 126 |
| | | d-5 | — | — | 84 |
| | | d-6 | — | — | — |
| | Surfactant (E) | e-1 | 5 | — | 5 |
| | | e-2 | — | 5 | — |
| | Plasticizer (F) | f-1 | 5 | — | — |
| | | f-2 | — | — | 5 |
| | Urethane-forming catalyst (G) | g-1 | 2 | 2 | 2 |

TABLE 2-continued

|  |  |  |  |
|---|---|---|---|
| Component (D) content (% by weight) of composition | 65.9 | 97.8 | 74.7 |
| Cumulative frequency (%) of component (D) in composition at particle size of 1 μm in particle size distribution curve | 0.0 | 0.0 | 0.0 |
| Total amount (parts by weight) of component (C) per 100 parts by weight of component (D) | 7.7 | 0.16 | 0.0 |
| Component (A1) content (% by weight) of component (A) | 45 | 45 | 50 |
| Isocyanate index (NCO/OH) | 0.54 | 0.80 | 0.76 |
| Urethane resin | Comparative Example 4 | Comparative Example 5 | Comparative Example 6 |
| Thermal Conductivity (W/m · K) | Not measurable | Not measurable | 0.7 |
| Flexibility (C hardness) | Not measurable | Not measurable | C(65) |

TABLE 3

| Composition | | | | Example 11 | Example 12 | Example 13 | Example 14 |
|---|---|---|---|---|---|---|---|
| Formulation (parts by weight) | First agent | Polyalkylene glycol (A1) | a1-1 | 100 | — | — | — |
| | | | a1-2 | — | 90 | 70 | 50 |
| | | Different polyol (A2) | a2-1 | — | — | 30 | — |
| | | | a2-2 | — | — | — | 50 |
| | | | a2-3 | — | — | — | — |
| | | | a2-4 | — | 10 | — | — |
| | | Dispersant (C) for inorganic fillers | c-1 | 20 | — | — | 45 |
| | | | c-2 | — | 3 | — | — |
| | | | c-3 | — | — | 40 | — |
| | | | c-4 | — | 2 | — | 45 |
| | | Inorganic filler (D1) | d-1 | 269 | 209 | — | — |
| | | | d-2 | 67 | 90 | — | — |
| | | | d-3 | — | — | 1900 | 1420 |
| | | | d-4 | — | — | 678 | 355 |
| | | | d-5 | — | — | — | — |
| | | | d-6 | — | — | 136 | — |
| | | Surfactant (E) | e-1 | 10 | — | 5 | — |
| | | | e-2 | — | 10 | — | 5 |
| | | Urethane-forming catalyst (G) | g-1 | 2 | 2 | 2 | 2 |
| | Second agent | Polyisocyanate (B) | b-1 | 30 | — | 50 | — |
| | | | b-2 | — | 30 | — | 20 |
| | | Inorganic filler (D2) | d-1 | 81 | 71 | — | — |
| | | | d-2 | 20 | 30 | — | — |
| | | | d-3 | — | — | 700 | 180 |
| | | | d-4 | — | — | 250 | 45 |
| | | | d-5 | — | — | — | — |
| | | | d-6 | — | — | 50 | — |
| | | Plasticizer (F) | f-1 | 10 | — | 5 | — |
| | | | f-2 | — | 10 | — | 5 |
| Component (D) content (% by weight) of composition | | | | 71.8 | 71.8 | 94.8 | 90.0 |
| Cumulative frequency (%) of component (D) in composition at particle size of 1 μm in particle size distribution curve | | | | 0.0 | 0.0 | 5.0 | 0.0 |
| Total amount (parts by weight) of component (C) per 100 parts by weight of component (D) | | | | 4.6 | 1.3 | 1.1 | 4.5 |
| Component (A1) content (% by weight) of component (A) | | | | 100 | 90 | 70 | 50 |
| Isocyanate index (NCO/OH) | | | | 0.50 | 0.59 | 0.59 | 0.60 |
| Component (D1) content (% by weight) of first agent | | | | 71.8 | 71.8 | 94.9 | 90.0 |
| Component (D2) content (% by weight) of second agent | | | | 71.7 | 71.7 | 94.8 | 90.0 |
| Total amount (parts by weight) of component (C) per 100 parts by weight of component (D1) | | | | 5.9 | 1.7 | 1.5 | 5.1 |
| Weight ratio of second agent to first agent (second agent/first agent) | | | | 0.30 | 0.34 | 0.37 | 0.13 |
| Urethane resin | | | | Example 16 | Example 17 | Example 18 | Example 19 |
| Thermal Conductivity (W/m · K) | | | | 1.3 | 1.5 | 6.1 | 2.4 |
| Flexibility (C hardness) | | | | A(15) | A(20) | A(38) | A(36) |

| Composition | | | | Example 15 | Comparative Example 7 | Comparative Example 8 | Comparative Example 9 |
|---|---|---|---|---|---|---|---|
| Formulation (parts by weight) | First agent | Polyalkylene glycol (A1) | a1-1 | 50 | 45 | — | 50 |
| | | | a1-2 | — | — | 45 | — |
| | | Different polyol (A2) | a2-1 | — | — | — | — |
| | | | a2-2 | — | — | — | — |
| | | | a2-3 | 50 | — | — | — |
| | | | a2-4 | — | 55 | 55 | 50 |

TABLE 3-continued

| | | | Example 20 | Comparative Example 10 | Comparative Example 11 | Comparative Example 12 |
|---|---|---|---|---|---|---|
| | Dispersant (C) for inorganic fillers | c-1 | — | 8 | — | — |
| | | c-2 | 10 | — | 5 | — |
| | | c-3 | 10 | 7 | — | — |
| | | c-4 | — | 8 | 5 | — |
| | Inorganic filler (D1) | d-1 | 840 | 126 | — | — |
| | | d-2 | — | 126 | — | — |
| | | d-3 | — | — | 3800 | 158 |
| | | d-4 | 300 | — | 1629 | 95 |
| | | d-5 | — | — | — | 63 |
| | | d-6 | 60 | — | — | — |
| | Surfactant (E) | e-1 | 10 | 5 | — | 5 |
| | | e-2 | — | — | 5 | — |
| | Urethane-forming catalyst (G) | g-1 | 2 | 2 | 2 | 2 |
| Second agent | Polyisocyanate (B) | b-1 | 30 | 20 | — | 30 |
| | | b-2 | — | — | 25 | — |
| | Inorganic filler (D2) | d-1 | 260 | 24 | — | — |
| | | d-2 | — | 24 | — | — |
| | | d-3 | — | — | 700 | 52 |
| | | d-4 | 91 | — | 300 | 31 |
| | | d-5 | — | — | — | 21 |
| | | d-6 | 20 | — | — | — |
| | Plasticizer (F) | f-1 | 5 | 5 | — | — |
| | | f-2 | 5 | — | — | 5 |
| Component (D) content (% by weight) of composition | | | 90.1 | 65.9 | 97.8 | 74.7 |
| Cumulative frequency (%) of component (D) in composition at particle size of 1 μm in particle size distribution curve | | | 5.1 | 0.0 | 0.0 | 0.0 |
| Total amount (parts by weight) of component (C) per 100 parts by weight of component (D) | | | 1.3 | 7.7 | 0.16 | 0.0 |
| Component (A1) content (% by weight) of component (A) | | | 50 | 45 | 45 | 50 |
| Isocyanate index (NCO/OH) | | | 0.52 | 0.54 | 0.80 | 0.76 |
| Component (D1) content (% by weight) of first agent | | | 90.1 | 66.0 | 97.9 | 74.7 |
| Component (D2) content (% by weight) of second agent | | | 90.3 | 65.8 | 97.6 | 74.8 |
| Total amount (parts by weight) of component (C) per 100 parts by weight of component (D1) | | | 1.7 | 9.1 | 0.18 | 0.0 |
| Weight ratio of second agent to first agent (second agent/first agent) | | | 0.31 | 0.19 | 0.18 | 0.33 |
| Urethane resin | | | Example 20 | Comparative Example 10 | Comparative Example 11 | Comparative Example 12 |
| Thermal Conductivity (W/m · K) | | | 2.5 | Not measurable | Not measurable | 0.7 |
| Flexibility (C hardness) | | | A(30) | Not measurable | Not measurable | C(65) |

The urethane resin sheets of Examples 6 to 10 produced using the compositions of Examples 1 to 5 had higher thermal conductivity and better flexibility than the urethane resin sheet of Comparative Example 6 produced using the composition of Comparative Example 3.

The urethane resin sheets of Examples 16 to 20 produced using the compositions of Examples 11 to 15 had higher thermal conductivity and better flexibility than the urethane resin sheet of Comparative Example 12 produced using the composition of Comparative Example 9.

These results demonstrate that the curable compositions of the present invention can provide urethane resins and heat dissipation components, each having excellent thermal conductivity and excellent flexibility.

The invention claimed is:

1. A curable composition comprising:
    a polyol (A);
    a polyisocyanate (B);
    at least one dispersant (C) for inorganic fillers selected from the group consisting of a phosphate ester (C1), a C12-C24 fatty acid (C2), a sucrose fatty acid ester (C3), a sorbitan fatty acid ester (C4), and a glycerol fatty acid ester (C5); and
    an inorganic filler (D),
    the curable composition satisfying the following requirements (1) to (3) that
    (1) the polyol (A) contains a polyalkylene glycol (A1) having a chemical formula weight or number average molecular weight of 1000 or less in an amount of 50% by weight or more based on the weight of the polyol (A);
    (2) the inorganic filler (D) is contained in an amount of 70 to 97% by weight based on the weight of the curable composition; and
    (3) the total weight of the dispersant (C) for inorganic fillers is 1 to 5 parts by weight per 100 parts by weight of the inorganic filler (D),
        the phosphate ester (C1) being represented by the following formula (1):

[Chem. 1]

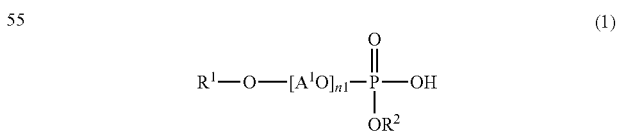

wherein $R^1$ is a hydrogen atom, a C2-C18 alkyl group, or a C2-C18 alkenyl group; $A^1O$ is a C2-C3 alkyleneoxy group; n1 is an integer of 3 to 15; and $R^2$ is a hydrogen atom or $-(A^2O)_{n2}R^3$, where $R^3$ is a C2-C18 alkyl group or a C2-C18 alkenyl group; $A^2O$ is a C2-C3 alkyleneoxy group; and n2 is an integer of 3 to 15.

2. The curable composition according to claim 1,
wherein the inorganic filler (D) contains at least one inorganic filler selected from the group consisting of metals, metal oxides, metal nitrides, metal hydroxides, and metal carbonates.

3. The curable composition according to claim 1,
wherein the inorganic filler (D) contains particles each having a particle size of 1 μm or smaller in a particle size distribution curve (volume basis, horizontal axis: log particle size (μm), vertical axis: frequency (%)) obtained by measurement using a laser diffraction particle size distribution measuring device.

4. The curable composition according to claim 1,
wherein the dispersant (C) for inorganic fillers comprises at least one selected from the group consisting of the phosphate ester (C1) and the C12-C24 fatty acid (C2) and at least one selected from the group consisting of the sucrose fatty acid ester (C3), the sorbitan fatty acid ester (C4), and the glycerol fatty acid ester (C5).

5. The curable composition according to claim 1,
wherein the curable composition comprises a first agent and a second agent,
the inorganic filler (D) includes a first inorganic filler (D1) contained in the first agent and a second inorganic filler (D2) contained in the second agent,
the first agent contains the polyol (A), the dispersant (C) for inorganic fillers, and the first inorganic filler (D1), and
the second agent contains the polyisocyanate (B) and the second inorganic filler (D2).

6. The curable composition according to claim 5,
wherein the first agent contains the first inorganic filler (D1) in an amount of 70 to 97% by weight based on the weight of the first agent.

7. The curable composition according to claim 5,
wherein a total weight of the dispersant (C) for inorganic fillers is 1 to 8 parts by weight per 100 parts by weight of the first inorganic filler (D1).

8. The curable composition according to claim 5,
wherein the second agent contains the second inorganic filler (D2) in an amount of 70 to 97% by weight based on the weight of the second agent.

9. The curable composition according to claim 5,
wherein a weight ratio of the second agent to the first agent (second agent/first agent) is 1/10 to 10/1.

10. A urethane resin which is a cured product of the curable composition according to claim 1.

11. A heat dissipation component comprising the urethane resin according to claim 10.

* * * * *